(12) United States Patent
Tsuchihashi et al.

(10) Patent No.: US 8,692,943 B2
(45) Date of Patent: Apr. 8, 2014

(54) ELECTRONIC DEVICE HAVING A LIQUID CRYSTAL SHUTTER

(75) Inventors: Moriyuki Tsuchihashi, Sagamihara (JP); Kohji Inoue, Yamato (JP); Susumu Hattori, Yokohama (JP); Takaaki Sakurai, Sagamihara (JP); Yi Zeng, Yokohama (JP)

(73) Assignee: Lenovo (Singapore) Pte Ltd, Singapore (SG)

( * ) Notice: Subject to any disclaimer, the term of this patent is extended or adjusted under 35 U.S.C. 154(b) by 50 days.

(21) Appl. No.: 13/524,418

(22) Filed: Jun. 15, 2012

(65) Prior Publication Data

US 2013/0063676 A1    Mar. 14, 2013

(30) Foreign Application Priority Data

Sep. 13, 2011   (JP) .................................. 2011-199018

(51) Int. Cl.
*G02F 1/133*   (2006.01)
*G02F 1/1343*   (2006.01)

(52) U.S. Cl.
USPC ................. 349/1; 349/73; 349/142; 349/158; 349/177; 396/457

(58) Field of Classification Search
USPC ............ 349/73, 110, 142, 158, 177; 396/292, 396/457, 506
See application file for complete search history.

(56) References Cited

U.S. PATENT DOCUMENTS

| | | | | |
|---|---|---|---|---|
| 5,419,991 | A * | 5/1995 | Segawa ........................... | 430/20 |
| 2006/0077279 | A1 * | 4/2006 | Kang ............................. | 348/335 |
| 2011/0076005 | A1 * | 3/2011 | Guo .............................. | 396/457 |
| 2013/0176512 | A1 * | 7/2013 | Posner et al. .................... | 349/33 |

FOREIGN PATENT DOCUMENTS

| | | |
|---|---|---|
| JP | 2008-009019 | 1/2008 |
| JP | 2009-157297 | 7/2009 |

* cited by examiner

*Primary Examiner* — Dung Nguyen
*Assistant Examiner* — Tai Duong
(74) *Attorney, Agent, or Firm* — Antony P Ng; Yudell Isidore Ng Russell PLLC

(57) ABSTRACT

An electronic device having a liquid crystal shutter is disclosed. A liquid crystal shutter is provided in an area formed by expanding a liquid crystal display. The liquid crystal shutter includes a rear polarizer, a rear glass substrate, a segmented electrode, a liquid crystal, a counter electrode, a front glass substrate, a shutter aperture, and a front polarizer. A camera module is disposed behind the rear polarizer. A voltage applied to the segmented electrode can be controlled to visually expose or hide the lens of the camera module from a shutter aperture.

15 Claims, 5 Drawing Sheets

US 8,692,943 B2

ELECTRONIC DEVICE HAVING A LIQUID CRYSTAL SHUTTER

PRIORITY CLAIM

The present application claims benefit of priority under 35 U.S.C. §§120, 365 to the previously filed Japanese Patent Application No. JP2011-199018 entitled, "ELECTRONIC DEVICE HAVING LIQUID CRYSTAL SHUTTER" with a priority date of Sep. 13, 2011, which is incorporated by reference herein.

BACKGROUND

1. Technical Field

The present invention relates to a shutter mechanism in general, and in particular to an electronic device having a shutter mechanism capable of visually exposing or hiding the electronic device.

2. Description of Related Art

Some notebook personal computers, tablet computers and smartphones use a liquid crystal display (LCD) as a flat display panel. Conventionally, there has been provided an edge frame formed of resin to hide a gap between the LCD and the inside of the housing around the periphery of the LCD. In recent years, however, there has been an increasing usage of so-called flat design in which a flat glass covers the whole surface including a display screen and a part corresponding to an edge frame around the periphery thereof (edge frame area).

As an example, for a tablet PC having a flat design LCD, printing is done in black ink in the edge frame area of the glass substrate. This type of tablet PC has a tendency to be preferred to have a totally-black edge frame in design. Therefore, if priority is given to a sense of unity in the color of the mainly-black edge frame, it has been difficult to provide a device that functions by being visually exposed in the edge frame.

In some cases, a camera module is disposed behind the edge frame even in a LCD having a full-flat design. In those cases, it is necessary to form an aperture having a transmittance increased by partially removing ink on the edge frame from the glass substrate in order to take light into a lens of the camera module. As a result, the lens behind the aperture looks whitish from the outside, which impairs the sense of unity in color with the edge frame.

Moreover, if an aperture is open though the camera module is not active, a user may feel uneasy, wondering whether the camera module is active to perform unintended photographing, in some cases. It is conceivable to use a method of providing a black mechanical shutter on the aperture in order to close the aperture when the user does not use the camera module and to project a sense of unity in color between the aperture and the edge frame. The problem with the above-mentioned method is that it is difficult to maintain the reliability in case of electrically controlling the opening-closing operation of the mechanical shutter, there is a limitation in space, and the mechanical shutter causes a cost increase.

Consequently, it would be desirable to provide a reliable shutter mechanism for electronic devices.

SUMMARY

In accordance with a preferred embodiment of the present invention, an electronic device includes a liquid crystal panel of an active matrix drive system, a liquid crystal shutter capable of controlling a panel transmittance, a device disposed on one side of the liquid crystal shutter, and a control unit for controlling a molecular arrangement of a liquid crystal so that the panel transmittance of the liquid crystal shutter is one of a first panel transmittance and a second panel transmittance higher than the first panel transmittance.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
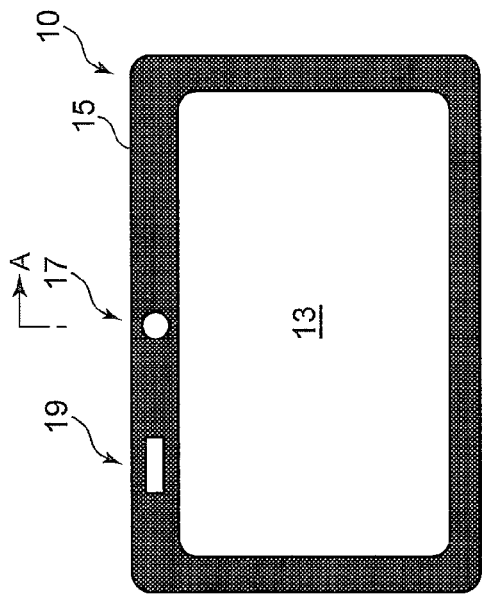
FIG. 1 is a diagram of an electronic device having a liquid crystal display and a liquid crystal shutter.

Referring now to the drawings, and in particular to FIG. 1, there is illustrated a diagram of an electronic device having a liquid crystal display and a liquid crystal shutter. As shown, an electronic device 10 may be a display unit of a tablet computer, a notebook computer (note PC), or a smartphone. If the electronic device 10 is a note PC, the electronic device 10 includes a housing on the system side (not shown). A black edge frame 15 is formed around the periphery of a display screen 13.

In a planar area of the edge frame 15, there are formed shutter apertures 17 and 19, which are areas having higher transmittance than the surroundings. The opening and closing of the shutter apertures 17 and 19 are controlled by changing the panel transmittance of a liquid crystal disposed on the rear side of the shutter apertures 17 and 19. The panel transmittance is a percentage of light passing through a liquid crystal panel 87 and a front polarizer 55 and emitted to the outside after the light is incident on a rear polarizer 53 from a light guide plate 69. In the present disclosure, the direction of the display screen will be referred to as the front side or the front surface, and the direction of the light guide plate 69 will be referred to as the rear side or the rear surface.

Figure 2:
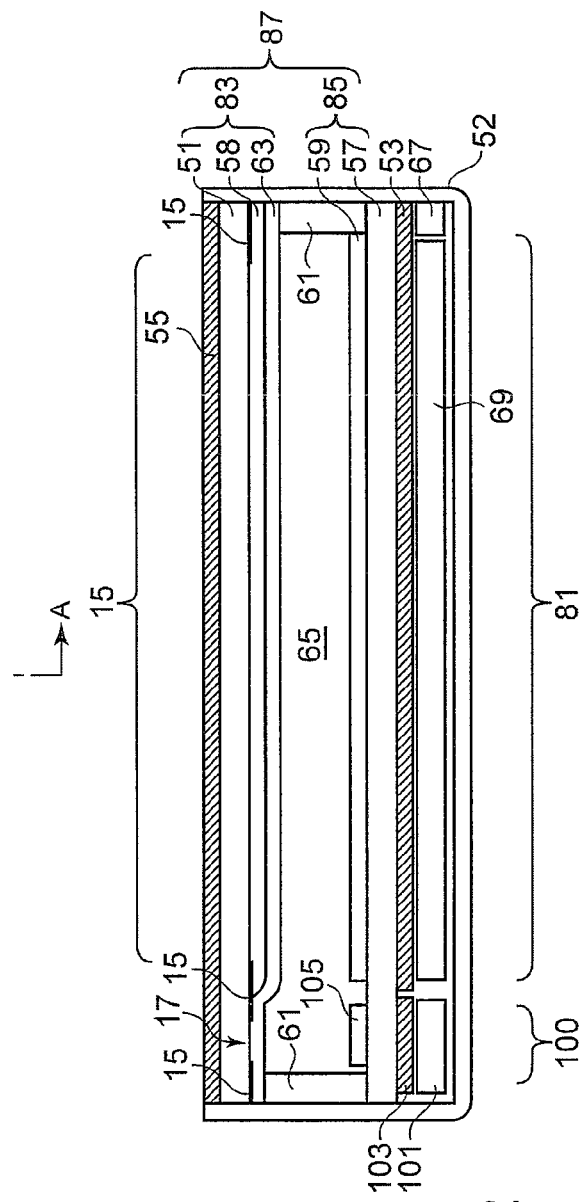
FIG. 2 is a cross-sectional view on arrow A-A of FIG. 1.
Figure 3:
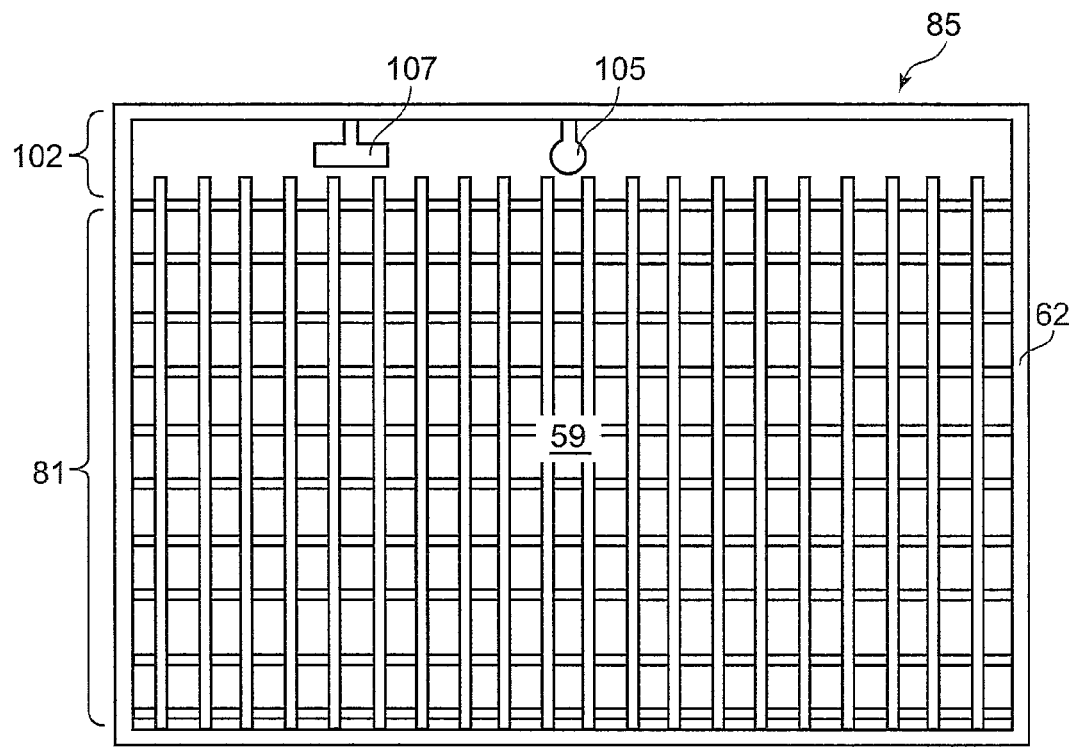
FIG. 3 is a diagram of a pixel matrix and segmented electrodes on an array substrate disposed inside a seal material.

FIG. 2 is a cross-sectional view on arrow A-A of FIG. 1. FIG. 3 is a top view of a pixel matrix and segmented electrodes on an array substrate disposed inside a seal material. In FIGS. 2 and 3, a liquid crystal shutter 100 is formed integrally with a liquid crystal display 81 by expanding an array substrate 85 of the liquid crystal display 81 and a color filter (CF) substrate 83, enclosing the periphery thereof with a seal material 61, and injecting a liquid crystal 65 into the enclosure. A complex made of the liquid crystal display 81 and the liquid crystal shutter 100 is housed inside a housing 52. The liquid crystal display 81 includes a backlight LED 67, the light guide plate 69 that multiply reflects the light emitted from the backlight LED 67 to the side surface and emits the light to the rear polarizer 53 as a surface light source, the rear polarizer 53, the liquid crystal panel 87, the front polarizer 55, and the like.

The front polarizer 55 extends to an area that constitutes the liquid crystal shutter 100. The rear polarizer 53 is disposed only in an area constituting the liquid crystal display 81. The front surface of the display screen 13 is made of a front polarizer 55. The front surface of the front polarizer 55 may be coated with protection coating as necessary. The liquid crystal display 81 can be used both as a glass substrate disposed on the front side and a front glass substrate 51 constituting the liquid crystal panel 87.

The present invention, however, is also applicable to a liquid crystal display in which another glass substrate is disposed outside the front polarizer 55. The liquid crystal panel 87 includes the array substrate 85, the CF substrate 83, the liquid crystal 65 put between the array substrate 85 and the CF substrate 83, and the seal material 61 for sealing the liquid crystal, and a spacer (not shown) for maintaining a gap between the array substrate 85 and the CF substrate 83.

The array substrate 85 includes a rear glass substrate 57, a pixel matrix 59, and an oriented film (not shown). The CF substrate 83 includes a front glass substrate 51, a color filter 58, a counter electrode 63, and an oriented film (not shown). The edge frame 15 is formed by screen printing of black ink on the rear surface of the front glass substrate 51. The edge frame 15 may be formed on the front surface of the front glass substrate 51. The edge frame 15 plays a role of hiding the peripheral part of the liquid crystal panel 87. The shutter apertures 17 and 19 are formed by removing the ink from the edge frame 15. Therefore, the display screen 13, the edge frame 15, and the shutter apertures 17 and 19, which correspond to the front surface of the front polarizer 55, exist on apparently the same surface, thereby projecting a sense of unity on a physical basis.

The pixel matrix 59 is formed only in an area constituting the liquid crystal display 81, while the counter electrode 63 extends to an area constituting the liquid crystal shutter 100. In other words, the counter electrode 63 of the liquid crystal panel 87 is extended and the extended part is used for the liquid crystal shutter 100. This enables the omission of wiring to a power supply circuit 205 (see FIG. 5) in comparison with the case of separately providing a counter electrode in the liquid crystal shutter 100.

The liquid crystal display 81 uses an active-matrix drive system as an electrical addressing scheme. The liquid crystal display 81 uses a twisted nematic (TN) mode as a liquid crystal display format and uses a normally white mode in which a panel transmittance is maximized in the case where a voltage is not applied to pixel electrodes as an operation mode. In the TN mode, it is possible, in theory, to use a normally black mode in which the panel transmittance is minimized in the case where a voltage is not applied to the pixel electrodes, but generally the normal white mode that tends to be superior in contrast is used.

The oriented film of the array substrate 85 and the oriented film of the CF substrate 83 are rubbed so that grooves for determining the array directions of the liquid crystal molecules are perpendicular to each other in the case where a voltage is not applied to the pixel electrodes. The polarizing axis of the front polarizer 55 coincides with the groove direction of the oriented film of the CF substrate 83, and the polarizing axis of the rear polarizer 53 coincides with the groove direction of the oriented film of the array substrate 85. Specifically, the liquid crystal display 81 is disposed so that the polarizing axis of the front polarizer 55 is perpendicular with the polarizing axis of the rear polarizer 53.

The liquid crystal shutter 100 includes elements in common with the liquid crystal display 81 and elements independent thereof. The elements in common include the rear glass substrate 57, the liquid crystal 65, the counter electrode 63, the oriented film of the array substrate 85, the oriented film of the CF substrate 83, the front glass substrate 51, and the front polarizer 55. The independent elements include the rear polarizer 103 disposed on the underside of the rear glass substrate 57, the segmented electrode 105, and the shutter aperture 17 formed on the edge frame 15. The oriented film of the array substrate 85 extends to the position crossing over the segmented electrode 105 and the oriented film of the CF substrate extends to the position crossing over the shutter aperture 17, where both oriented films are rubbed in the same direction as the area constituting the liquid crystal display 81.

Therefore, the liquid crystal display format of the liquid crystal shutter 100 is the TN mode similarly to the liquid crystal display 81. The rear polarizer 103 is disposed so that the polarizing axis thereof is parallel to the front polarizer 55, and the liquid crystal shutter 100 operates in the normally black mode in which the panel transmittance is minimized when a voltage is not applied to the segmented electrode 105. In the liquid crystal shutter 100, the transmittance is binary-controlled over the entire areas of the shutter apertures 17 and 19. Therefore, the use of the normally black mode does not cause a problem of contrast in the liquid crystal shutter 100. To place the liquid crystal shutter 100 in the normally black mode, it is also possible to extend the rear polarizer 53 up to the area of the liquid crystal shutter 100, to dispose the front polarizer 55 only in the area of the liquid crystal display 81, and to dispose a polarizer, which is parallel to the polarizing axis of the rear polarizer 103, in the area constituting the liquid crystal shutter 100.

The camera module 101 is disposed on the rear side of the rear polarizer 103. The camera module 101 includes an image sensor, an image processing circuit, and the like and converts an image of a subject to digital data and sends it to a system 150 (See FIG. 4). The shape of the shutter aperture 17 is preferably minimized in a range in which the lens of the camera module 101 is not interrupted to condense light. This enables the portions other than the lens of the camera module 101 can be hidden in the rear side of the edge frame 15 when the shutter aperture 17 opens.

In FIG. 3, the area enclosed by the seal material 61 is segmented into the liquid crystal display 81 and a liquid crystal shutter area 102. In the liquid crystal shutter area 102, a segmented electrode 105 is disposed under the shutter aperture 17 and the segmented electrode 107 is disposed under the shutter aperture 19. The segmented electrodes 105 and 107 are each formed of a transparent conductive film (ITO) on the same layer as the pixel electrodes of the pixel matrix 59. A shutter control circuit 207 (see FIG. 5) controls the opening and closing of the shutter aperture 17 by applying an AC voltage between the segmented electrode 105 and the counter electrode 63 and controls the opening and closing of the shutter aperture 19 by applying an AC voltage between the segmented electrode 107 and the counter electrode 63.

The use of the segmented electrodes 105 and 107 as the electrodes of the liquid crystal shutter 100 does not lead to a decrease in the panel transmittance that arises from an aperture ratio of pixels in comparison with a method of using a pixel matrix described later. The configuration of the liquid crystal shutter including the segmented electrode 107 and the shutter aperture 19 is the same as the liquid crystal shutter 100 except that a state indicating device 151 (see FIG. 4) is disposed on the rear side of the rear polarizer 103. Therefore, in the subsequent description, the structure of the liquid crystal shutter including the segmented electrode 107 and the shutter aperture 19 will be also referred to as the liquid crystal shutter 100.

When the shutter apertures 17 and 19 are opened, an AC voltage is applied between the segmented electrode 105 and the counter electrode 63 and between the segmented electrode 107 and the counter electrode 63 individually and continuously while the shutter control circuit 207 opens the shutter. In this regard, the electrical addressing scheme of the liquid crystal shutter 100 enables the segmented electrode formed of a plurality of elements to be included in a range of static drive for individually applying a voltage to the respective elements during display period.

Figure 4:
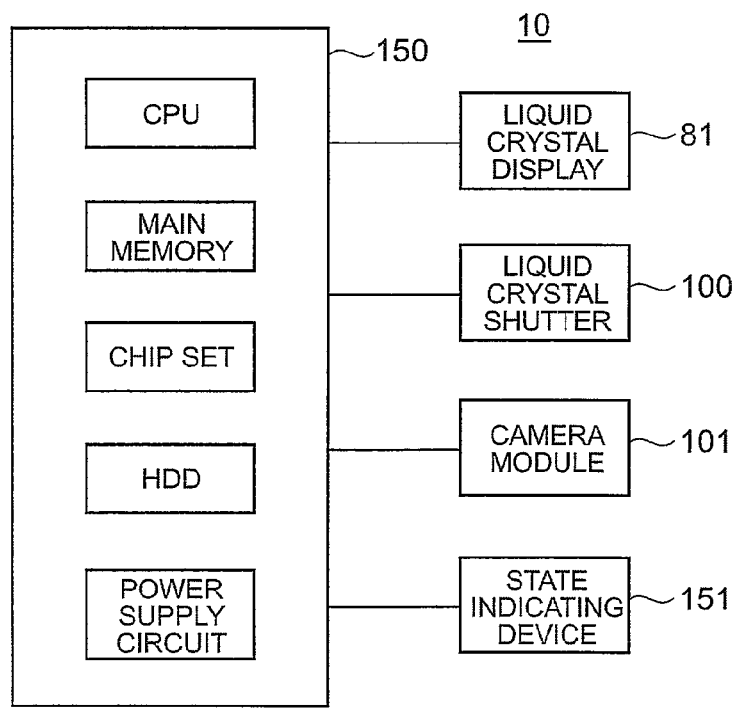
FIG. 4 is a block diagram of an electronic device.

FIG. 4 is a block diagram of the electronic device 10. As shown, the system 150 includes hardware such as a central processing unit (CPU), a main memory, a chip set, a hard disk drive (HDD), and a power supply circuit and software such as an operating system (OS), a device driver, and an application program. The system 150 is connected to the liquid crystal display 81, the liquid crystal shutter 100, the camera module 101, and the state indicating device 151.

The electronic device 10 includes several power states such as a power-on state in which all functions can be performed, a power-off state in which all functions are stopped, and a suspend state in which a part of functions can be maintained or from which the electronic device 10 can transition to the power-on state in a short time. The liquid crystal display 81, the liquid crystal shutter 100, the camera module 101, and the state indicating device 151 are powered off unless the electronic device 10 is placed in the power-on state. The state indicating device 151 may be an indicator formed of an LED. The state indicating device 151 displays necessary information when the electronic device is placed in the power-on state such as the operating state of a wireless module, an access state to the HDD, and a battery charging state.

Figure 5:
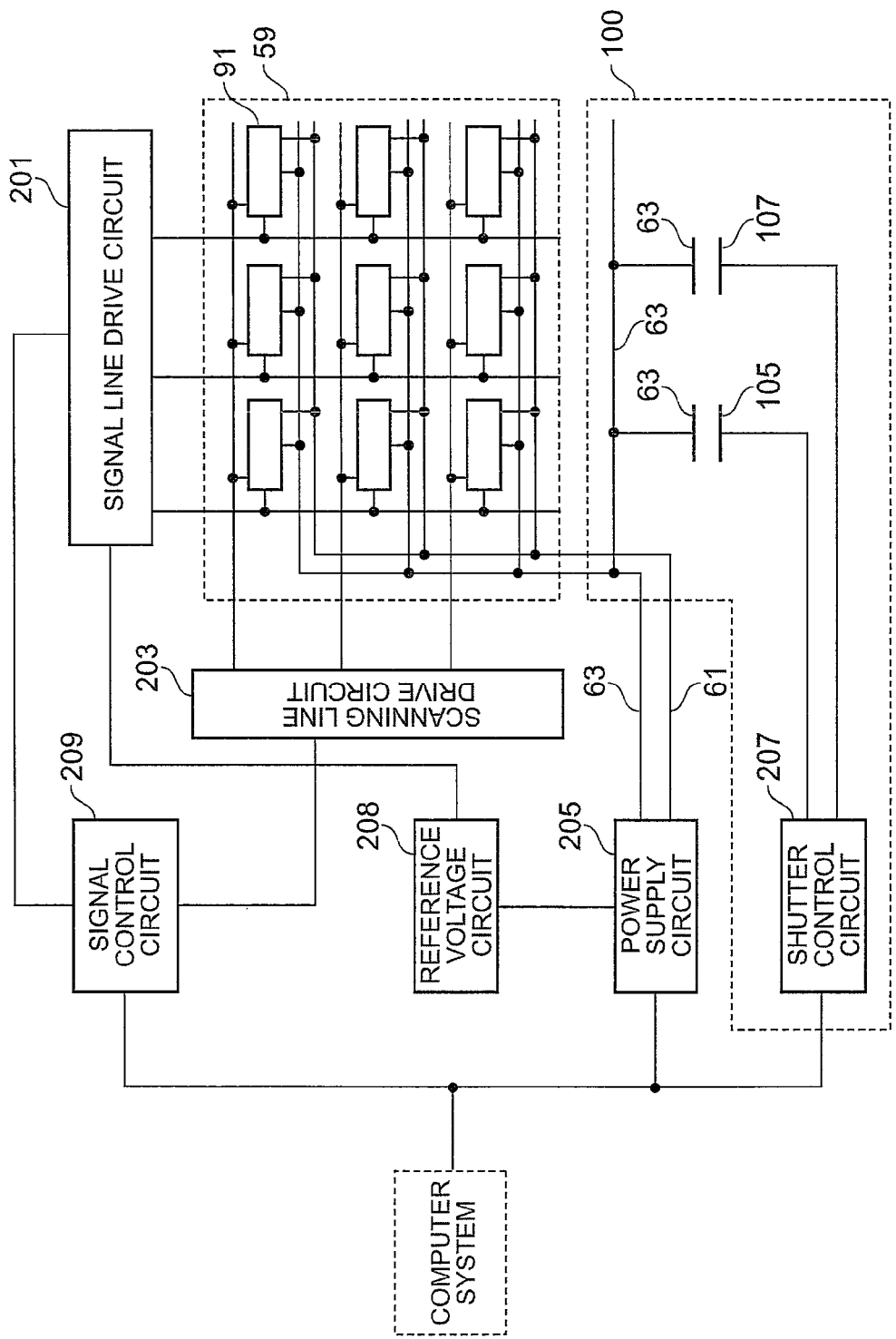
FIG. 5 is a block diagram of a liquid crystal panel and a liquid crystal shutter.

FIG. 5 is a block diagram of the liquid crystal panel 87 and the liquid crystal shutter 100. The liquid crystal panel 87 includes a pixel matrix 59, a signal line drive circuit 201, a scanning line drive circuit 203, a power supply circuit 205, a reference voltage circuit 208, and a signal control circuit 209. The signal control circuit 209 generates a control signal necessary to activate the liquid crystal panel 87 from an RGB data signal received from the system 150 and sends the control signal to a signal line drive circuit 201 and a scanning line drive circuit 203. The reference voltage circuit 208 sends reference voltages of a plurality of values for generating gray scale voltages to a signal line drive circuit 201. The power supply circuit 205 supplies power to the liquid crystal display 81 and the liquid crystal shutter 100 and further provides the pixel matrix 59 with a reference potential.

In the pixel matrix 59, a 3×3 pixel 91 is illustrated in FIG. 5. Actually, however, multiple pixels conforming to the pixel standard are formed in the intersections between a scanning signal line and a display signal line. Each pixel 91 includes a thin-film transistor (TFT), a pixel electrode, a liquid crystal capacitor, and an auxiliary capacitor. The liquid crystal capacitor is formed between the pixel electrode and the counter electrode 63 connected to the power supply circuit 205. The auxiliary capacitor is connected to the power supply circuit 205 via an auxiliary capacitor line 62. In the liquid crystal display 81, the signal line drive circuit 201 and the scanning line drive circuit 203 perform line sequential scanning on the pixel matrix and write the RGB data signals into the respective pixels on the basis of the RGB data signals received from the system 150, synchronization signals, and clock signals.

In the liquid crystal shutter 100, the segmented electrodes 105 and 107 are connected to the shutter control circuit 207. In each of the segmented electrodes 105 and 107, a liquid crystal capacitor is formed by placing a liquid crystal between the segmented electrode 105 or 107 and the counter electrode 63. The shutter control circuit 207 constitutes a part of the liquid crystal shutter 100. When the electronic device 10 is placed in the power-on state, the shutter control circuit 207 applies an AC voltage of 60 Hz to the segmented electrodes 105 and 107 or stops the application of the AC voltage according to an instruction from the system 150. The reason why the AC voltage is applied to activate the liquid crystal shutter 100 is the same as that for which frame inversion driving is performed for the pixel matrix 59 to prevent the deterioration of the liquid crystal. Therefore, the segmented electrodes 105 and 107 operate independently of the pixel matrix 59. Line sequential scanning is not performed for the segmented electrodes 105 and 107 as for the pixel matrix 59, and therefore there is no need to provide the segmented electrodes 105 and 107 with an auxiliary capacitor.

The shutter control circuit 207 applies a voltage of only one of two voltage values to obtain different transmittances, unlike the signal line drive circuit 201 that applies gray scale voltages to the pixel electrodes. The binary voltage may have arbitrary two voltage values selected from the gray scale voltages. In this embodiment, however, only one of the voltage value maximizing the panel transmittance and the voltage value minimizing the panel transmittance is applied. The shutter control circuit 207 applies the voltage maximizing the panel transmittance to the segmented electrodes 105 and 107 during opening the liquid crystal shutter 100 in the normally black mode.

Operation of Liquid Crystal Shutter

Figure 6A:
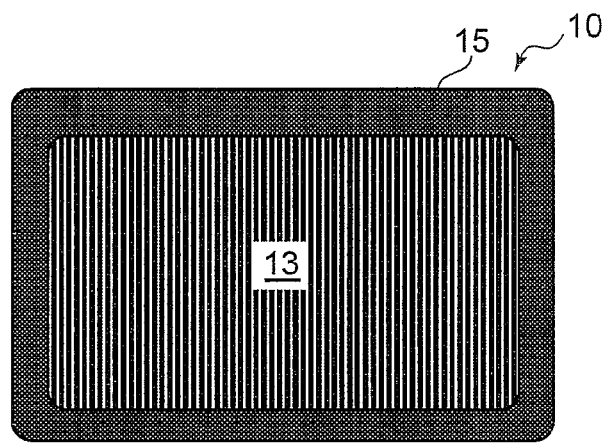
FIGS. 6A-6C are diagrams illustrating various operating states of the liquid crystal shutter.
Figure 6B:
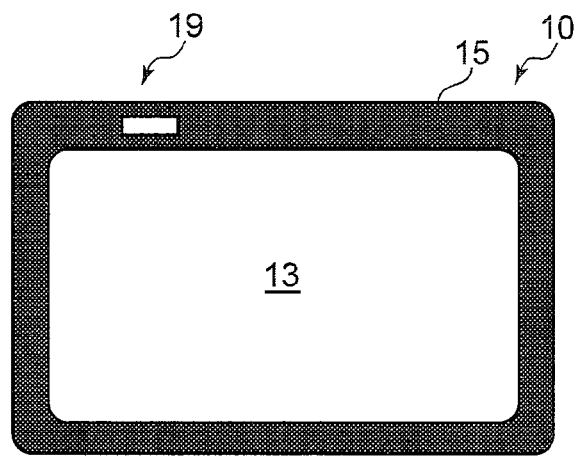
Figure 6C:
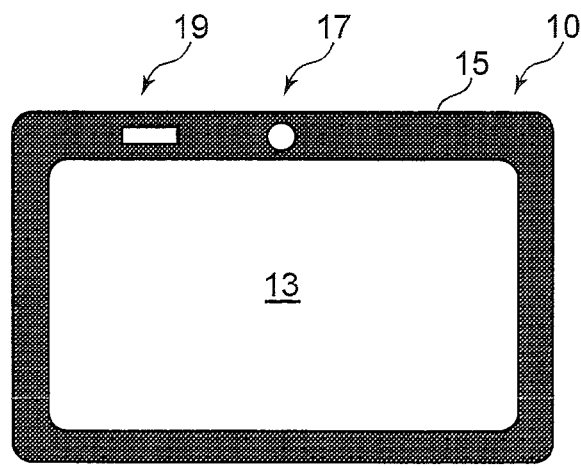

FIGS. 6A-6C are diagrams describing the operating state of the electronic device 10 and the operating state of the liquid crystal shutter 100. FIG. 6A illustrates an operating state in which the electronic device 10 is placed in the power-off state or the suspend state. FIGS. 6B and 6C illustrate an operating state in which the electronic device 10 is placed in the power-on state.

When the system 150 is placed in the power-off state or in the suspend state regarding power, the power of the liquid crystal display 81 is stopped. Therefore, as illustrated in FIG. 6A, the liquid crystal display 81 in the power-off state has a display screen 13 in gray close to black. The reason why the display screen 13 is in gray close to black in spite of the normally white mode of the liquid crystal display 81 is that the color filter 58 absorbs light incident on the surface or light which has passed through the color filter 58 further passes through the light guide plate 69 so as not to be reflected thereon.

Moreover, when the system 150 is in the power-off state or the suspend state regarding power, the power of the liquid crystal shutter 100 is stopped, too. Therefore, the liquid crystal shutter 100 in the normally black mode is closed and turns black. Therefore, the shutter apertures 17 and 19 are attuned in color to the color of the edge frame 15. Due to the closure of the shutter aperture 17 where the camera module 101 is disposed, a user achieves a sense of security such that unintended photographing is prevented.

When the system 150 is placed in the power-on state, as illustrated in FIG. 6B, power is supplied to the liquid crystal display 81 and to the liquid crystal shutter 100, by which an image is displayed on the display screen 13. The state indicating device 151 starts the operation simultaneously with that the system 150 is placed in the power-on state. The shutter control circuit 207 is supplied with power simultaneously with that the electronic device 10 is placed in the power-on state. The system 150 sends an opening signal to the shutter control circuit 207 in order to open the shutter aperture 19 in conjunction with the change to the power-on state.

Upon receiving the opening signal, the shutter control circuit 207 applies the voltage maximizing the panel transmittance to the segmented electrode 107. As a result, as illustrated in FIG. 6B, the state indicating device 151 disposed behind the shutter aperture 19 becomes visually exposed, thereby enabling the user to recognize the light-emitting state of the LED. Thereafter, the shutter control circuit 207 continues to apply the same voltage to the segmented electrode 107 until receiving a closing signal from the system 150.

At this time point, the camera module 101 is not used and therefore the system 150 maintains the shutter aperture 17 to be closed. Subsequently, the user gives an instruction to the system 150 to use the camera module 101. The system 150 sends an actuating signal to the camera module 101 and sends an opening signal to the shutter control circuit 207 in order to open the shutter aperture 17. Upon receiving the opening signal, the shutter control circuit 207 applies a voltage maximizing the panel transmittance to the segmented electrode 105. As a result, as illustrated in FIG. 6C, the lens of the camera module 101 disposed behind the shutter aperture 17 is visually exposed so as to be ready for photographing.

The system 150 subsequently sends a signal for starting photographing to the camera module 101. The system 150 maintains the shutter aperture 17 to be open until the photographing ends. The user gives an instruction to the system 150 upon the end of the photographing. The system 150 stops the operation of the camera module 101 and sends a closing signal to the shutter control circuit 207 in order to close the shutter aperture 17. Upon receiving the closing signal, the shutter control circuit 207 applies a voltage minimizing the panel transmittance to the segmented electrode 105. In this manner, the user instructs the system to perform a photographing operation on the camera module 101. The shutter aperture 17 performs the opening-closing operation in conjunction with the instruction.

Photographing Flash

The system 150 is also able to use the display screen 13 as a photographing flash in conjunction with the photographing operation of a static image of the camera module 101. The backlight LED 67 is configured to be set to a practical maximum luminance in consideration of the lifetime thereof. The backlight LED 67, however, may be set to a higher luminance than the maximum luminance used when the liquid crystal display 81 displays an image as long as the setting is temporary.

For example, assuming that the maximum luminance of the display screen 13 is 400 nit, it is possible to control the electric current of the backlight LED 67 so that the luminance of the display screen 13 is brought to 600 nit with white display only at the timing of photographing a static image and then the luminance is returned to 400 nit after the end of the photographing. When the camera module 101 photographs a static image, the shutter aperture 17 is configured to perform the opening-closing operation in conjunction with the photographing. Therefore, the luminance of the backlight LED 67 is able to be controlled in concert with the opening-closing timing of the shutter aperture 17.

Other Embodiments

In the present invention, a sense of unity in design of the front surface state and the color is achieved with respect to the shutter apertures 17 and 19 and the edge frame 15. Regarding the front surface state, the liquid crystal shutter 100 and the edge frame 15 are disposed inside the front glass substrate 51, so that the front surface exists in the same plane as the display screen 13. According to the present invention, however, even in the case where the edge frame is made of a member different from that of the glass substrate, it is possible to achieve a reliable shutter mechanism in which a liquid crystal shutter is disposed in shutter apertures 17 and 19 formed by cutting out the shapes thereof from the edge frame.

How color is attuned depends on the color of the edge frame, the operation mode of the liquid crystal shutter 100, and the type of the device arranged on the rear side of the liquid crystal shutter 100. If the device is the camera module 101, the closure of the shutter aperture 17 in the power-off state or the suspend state leads to the user's sense of security and therefore the operation mode of the liquid crystal shutter is preferably the normally black mode. In this embodiment, in the above case, black color is used for the edge frame 15, so that a sense of unity in color can be projected in both cases where the electronic device 10 is placed in the power-off state or the suspend state and the electronic device 10 is placed in the power-on state with the shutter apertures 17 and 19 closed.

If the device is a state indicating device is activated in the power-off state or the suspend state, the operation mode of the liquid crystal shutter 100 needs to be the normally white mode. As this type of state indicating device, there is an indicator that indicates the battery charging state, the power state of the electronic device, the connecting state of an AC/DC adapter, or the like. Further, if the state indicating device is an electronic paper with black/white display, the use of a white color for the edge frame enables the color of the edge frame to be the same as the background color of the electronic paper inside the shutter aperture 19 in the power-off state or the suspend state, thereby projecting a sense of unity in color.

Although the opening and closing of the shutter apertures 17 and 19 are controlled by applying the voltage value minimizing the panel transmittance and the voltage value maximizing the panel transmittance to the segmented electrode 107 in the above-mentioned embodiment, it is also possible to apply a binary voltage different from these voltage values in the present invention. For example, if the color of the edge frame is gray, it is possible to apply a voltage value causing a color close to the color of the edge frame, instead of the voltage value minimizing the panel transmittance.

Although this embodiment has been described taking an example of forming the liquid crystal shutter 100 by using the elements in common with the liquid crystal display 81 in this embodiment, all elements of the liquid crystal shutter may be independent of the elements of the liquid crystal display according to the present invention. In addition, although the opening/closing control of the liquid crystal shutter 100 has been described by giving an example of a static drive with the segmented electrodes 105 and 107, an active-matrix drive may be used.

Figure 7:
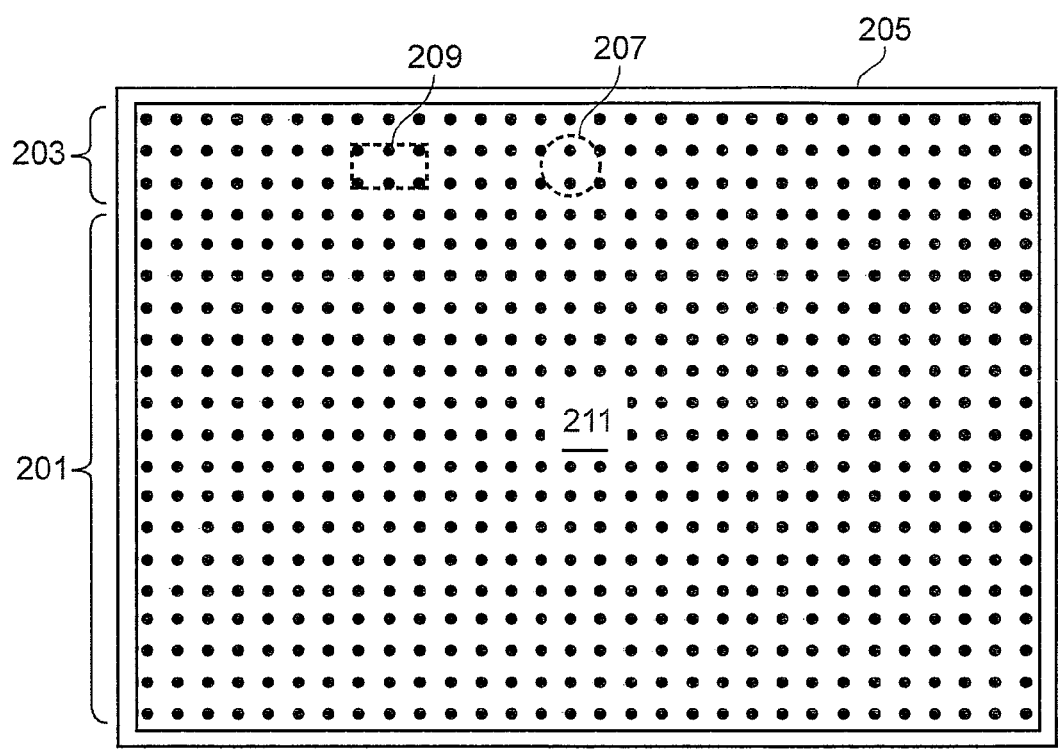
FIG. 7 is a diagram describing an example that the electrodes of the liquid crystal shutter are each formed of a pixel matrix.

FIG. 7 is a diagram illustrating an example of using the active-matrix drive for the liquid crystal shutter. A liquid crystal panel 201 is formed by expanding a pixel matrix 211 up to an area constituting a liquid crystal shutter area 203. The liquid crystal is injected into an area enclosed by a seal material 205. The rubbing direction of an oriented film, the polarizing axis direction of a polarizer, shutter apertures, and the like are the same as those described with reference to FIG. 2. The liquid crystal shutter area 203, however, does not need to be provided with a color filter 58. For the pixel matrix 211 constituting the liquid crystal shutter area 203, a pixel area 207 is defined in the position corresponding to the shutter aperture 17 and a pixel area 209 is defined in the position corresponding to the shutter aperture 19.

A signal control circuit 209 controls the panel transmittances of the liquid crystal display 201 and the liquid crystal shutter area 203 by performing line sequential scanning with respect to all pixels. The system 150 sends an RGB data signal to the signal control circuit 209, where the RGB data signal is intended to always apply one of the binary gray scale voltages to the pixel electrodes in the pixel areas 207 and 209. The system 150 sends an RGB data signal to the signal control circuit 209, where the RGB data signal is intended to always apply a gray scale voltage minimizing the panel transmittance to the pixel electrodes of the pixel areas other than the pixel areas 207 and 209 among the pixels included in the liquid crystal shutter area 203. The usage of the pixel matrix 211 for the electrodes of the liquid crystal shutter allows cost reduction even when there is an increase in the number of shutter apertures because the pixel matrix is able to be formed by an extension of a process of manufacturing an array substrate.

Moreover, the system 150 is able to form a liquid crystal shutter having an arbitrary shape in an arbitrary position only by changing RGB data supplied to the signal control circuit 209. Further, there is no need to provide a shutter control circuit 207 in addition to the signal control circuit 209. The TN mode in the normally white mode is used for the liquid crystal display format and the normally black mode is used by changing the polarizing axis direction of the polarizer for the liquid crystal shutter. With the present invention, it is also possible to use an in-plane switching (IPS) mode or a vertical alignment (VA) mode used in the normally black mode for the liquid crystal display format of the liquid crystal display and the liquid crystal shutter.

As has been described, the present invention provides a reliable shutter mechanism for electronic devices.

While the invention has been particularly shown and described with reference to a preferred embodiment, it will be understood by those skilled in the art that various changes in form and detail may be made therein without departing from the spirit and scope of the invention.

What is claimed is:

1. An electronic device comprising:
a liquid crystal panel within an active matrix drive system;
a liquid crystal shutter, capable of controlling a panel transmittance, is formed by expanding an area filled with liquid crystals of said liquid crystal panel, wherein said liquid crystal shutter includes a segmented electrode and an extended counter electrode of said liquid crystal panel;
a camera module disposed on one side of said liquid crystal shutter; and
a control unit for controlling a molecular arrangement of liquid crystals such that panel transmittance of said liquid crystal shutter is adjustable.

2. The electronic device of claim 1, wherein said electrodes of said liquid crystal shutter include a part of a pixel matrix controlled in said active matrix drive system by using a drive circuit of said liquid crystal panel and said extended counter electrode of said liquid crystal panel.

3. The electronic device of claim 1, wherein said liquid crystal shutter is disposed in an area partially high in transmittance in an edge frame area disposed around a periphery of a display screen of said liquid crystal panel.

4. The electronic device of claim 3, wherein said edge frame is formed in an ink pattern printed on a glass substrate.

5. The electronic device of claim 4, wherein said glass substrate is part of said liquid crystal panel.

6. The electronic device of claim 1, wherein said control unit controls said liquid crystal shutter in conjunction with a usage state of said camera module.

7. An electronic device comprising:
a liquid crystal panel within an active matrix drive system, wherein said liquid crystal panel including an array substrate, a liquid crystal, and a color filter substrate;
an edge frame disposed around a display screen of said liquid crystal panel, wherein said edge frame has a partially high transmittance area;
a rear polarizer disposed on a rear surface of said liquid crystal panel;
a front polarizer disposed on a front surface of said liquid crystal panel;
a liquid crystal shutter, capable of controlling a panel transmittance, is formed by expanding an area filled with liquid crystals of said liquid crystal panel, wherein said liquid crystal shutter includes a segmented electrode and an extended counter electrode of said liquid crystal panel;
a camera module disposed on a rear side of said liquid crystal shutter; and
a control unit for controlling a molecular arrangement of said liquid crystal such that said panel transmittance of said liquid crystal shutter is one of a first panel transmittance and a second panel transmittance higher than said first panel transmittance.

8. The electronic device of claim 7, wherein an operation mode of said liquid crystal shutter is a black mode.

9. The electronic device of claim 8, wherein said color of said edge frame is black.

10. The electronic device of claim 9, wherein an operation mode of said liquid crystal panel is a white mode, said liquid crystal of said liquid crystal shutter is injected into a section enclosed by a seal material that is the same as for said liquid crystal of said liquid crystal panel, wherein said liquid crystal shutter includes a first polarizer disposed so that a polarizing axis thereof is oriented in said same direction as said polarizing axis of said front polarizer or as said polarizing axis of said rear polarizer and a second polarizer disposed so that said polarizing axis thereof is in parallel to said first polarizer.

11. The electronic device of claim 7, wherein said control unit controls said liquid crystal shutter in conjunction with an operation of said camera module.

12. The electronic device of claim 11, wherein said control unit temporarily increases a luminance of a backlight to a level higher than a maximum luminance for displaying an image on said liquid crystal display when said control unit controls said liquid crystal shutter to have said second panel transmittance.

13. An electronic device comprising:
a liquid crystal panel within an active matrix drive system;
an edge frame disposed around a border of a display screen of said liquid crystal panel, wherein said edge includes a partially high transmittance area;
a liquid crystal shutter, capable of controlling a panel transmittance, is formed by expanding an area filled with liquid crystals of said liquid crystal panel, wherein said liquid crystal shutter includes a segmented electrode and an extended counter electrode of said liquid crystal panel;
a state indicating device disposed on a rear side of said liquid crystal shutter; and
a control unit for controlling a molecular arrangement of liquid crystals such that said panel transmittance of said liquid crystal shutter is one of a first panel transmittance and a second panel transmittance higher than said first panel transmittance.

14. The electronic device of claim 13, wherein an operation mode of said liquid crystal shutter is a white mode.

15. The electronic device of claim 13, wherein said state indicating device includes an indicator for indicating an operating state of said electronic device.

* * * * *